(12) United States Patent
Chang (10) Patent No.: US 9,143,034 B2
(45) Date of Patent: Sep. 22, 2015

(54) DC-DC CONTROLLER AND MULTI-RAMP SIGNAL OPERATING METHOD THEREOF

(71) Applicant: uPI Semiconductor Corp., Hsinchu County (TW)

(72) Inventor: Chih-Lien Chang, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 0 days.

(21) Appl. No.: 14/164,274

(22) Filed: Jan. 27, 2014

(65) Prior Publication Data

US 2014/0333278 A1   Nov. 13, 2014

(30) Foreign Application Priority Data

May 13, 2013   (TW) .............................. 102116930 A (51) Int. Cl.
*H02M 3/156* (2006.01)
*H02M 3/158* (2006.01)

(52) U.S. Cl.
CPC ............ *H02M 3/156* (2013.01); *H02M 3/1584* (2013.01)

(58) Field of Classification Search
CPC ............. H02M 2001/0032; H02M 2001/0025; G05F 1/10
USPC .................. 323/222–225, 268–277, 282–288
See application file for complete search history.

(56) References Cited

U.S. PATENT DOCUMENTS

| 6,057,675 | A | 5/2000 | Tateishi | |
| 6,522,115 | B1 * | 2/2003 | Greitschus | ................... 323/288 |
| 7,453,250 | B2 | 11/2008 | Qiu et al. | |
| 7,868,600 | B2 | 1/2011 | Qiu et al. | |
| 8,138,740 | B2 * | 3/2012 | Yuan | .............................. 323/288 |
| 8,649,194 | B2 * | 2/2014 | Chiang | ............................ 363/44 |
| 8,664,982 | B2 * | 3/2014 | Chen et al. | ..................... 327/134 |
| 8,912,775 | B2 * | 12/2014 | Feldtkeller et al. | ........... 323/272 |
| 2006/0043955 | A1 * | 3/2006 | Hung | ............................ 323/283 |
| 2007/0013356 | A1 * | 1/2007 | Qiu et al. | ...................... 323/288 |
| 2007/0210782 | A1 * | 9/2007 | Prexl et al. | ..................... 323/288 |

(Continued)

FOREIGN PATENT DOCUMENTS

TW   201021389   6/2010

OTHER PUBLICATIONS

"Office Action of Taiwan Counterpart Application", issued on Sep. 26, 2014, p. 1-p. 7.

*Primary Examiner* — Timothy J Dole
*Assistant Examiner* — Yusef Ahmed
(74) *Attorney, Agent, or Firm* — Jianq Chyun IP Office (57) ABSTRACT

A DC-DC controller and a multi-ramp signal operating method thereof are provided. The DC-DC controller includes a ramp generating unit, a comparator, a logic circuit and a switch unit. The ramp generating unit generates a first interior-ramp signal and a second interior-ramp signal alternately. The logic circuit generates the first and second control signals according to a comparison signal of the comparator. The switch unit is configured to switch one of the first interior-ramp signal and the second interior-ramp signal alternately to a second terminal of the comparator according to the first and second control signals. When the second interior-ramp signal is switched to the comparator, the first interior-ramp signal is charged to a first voltage level by the ramp generating unit. In another switch procedure, the second interior-ramp signal is charged to a second voltage level by the ramp generating unit.

10 Claims, 5 Drawing Sheets

(56) References Cited

U.S. PATENT DOCUMENTS

| | | |
|---|---|---|
| 2008/0030181 A1* | 2/2008 | Liu et al. .................... 323/283 |
| 2008/0062731 A1* | 3/2008 | Chang et al. .................... 363/78 |
| 2010/0033152 A1* | 2/2010 | Chen et al. .................... 323/288 |
| 2010/0102788 A1* | 4/2010 | Kuroyabu et al. ............ 323/282 |
| 2010/0231189 A1* | 9/2010 | Chen et al. .................... 323/284 |
| 2011/0031948 A1* | 2/2011 | Chien et al. ................... 323/282 |
| 2011/0074373 A1* | 3/2011 | Lin ................................ 323/282 |
| 2011/0115450 A1* | 5/2011 | Pongratananukul .......... 323/271 |
| 2011/0316518 A1* | 12/2011 | Feng et al. .................... 323/349 |
| 2012/0019225 A1* | 1/2012 | Tsai ............................... 323/284 |
| 2012/0038331 A1 | 2/2012 | Wu et al. |
| 2012/0081084 A1* | 4/2012 | Yang et al. .................... 323/235 |
| 2012/0146594 A1* | 6/2012 | Kobayashi .................... 323/234 |
| 2012/0146608 A1 | 6/2012 | Wan et al. |
| 2012/0206121 A1* | 8/2012 | Evans et al. .................. 323/288 |
| 2013/0038301 A1* | 2/2013 | Ouyang et al. ............... 323/271 |
| 2013/0249511 A1* | 9/2013 | Kalje et al. ................... 323/271 |
| 2014/0021928 A1* | 1/2014 | Chen ............................. 323/271 |
| 2014/0266117 A1* | 9/2014 | Goncalves et al. ........... 323/283 |
| 2014/0292299 A1* | 10/2014 | Yang et al. .................... 323/288 |

* cited by examiner

DC-DC CONTROLLER AND MULTI-RAMP SIGNAL OPERATING METHOD THEREOF

CROSS-REFERENCE TO RELATED APPLICATION

This application claims the priority benefit of Taiwan application serial no. 102116930, filed on May 13, 2013. The entirety of the above-mentioned patent application is hereby incorporated by reference herein and made a part of this specification.

BACKGROUND

1. Technical Field

The invention relates to a direct current (DC)-to-DC control technique. Particularly, the invention relates to a DC-DC controller and a multi-ramp signal operating method thereof.

2. Related Art

Figure 1:
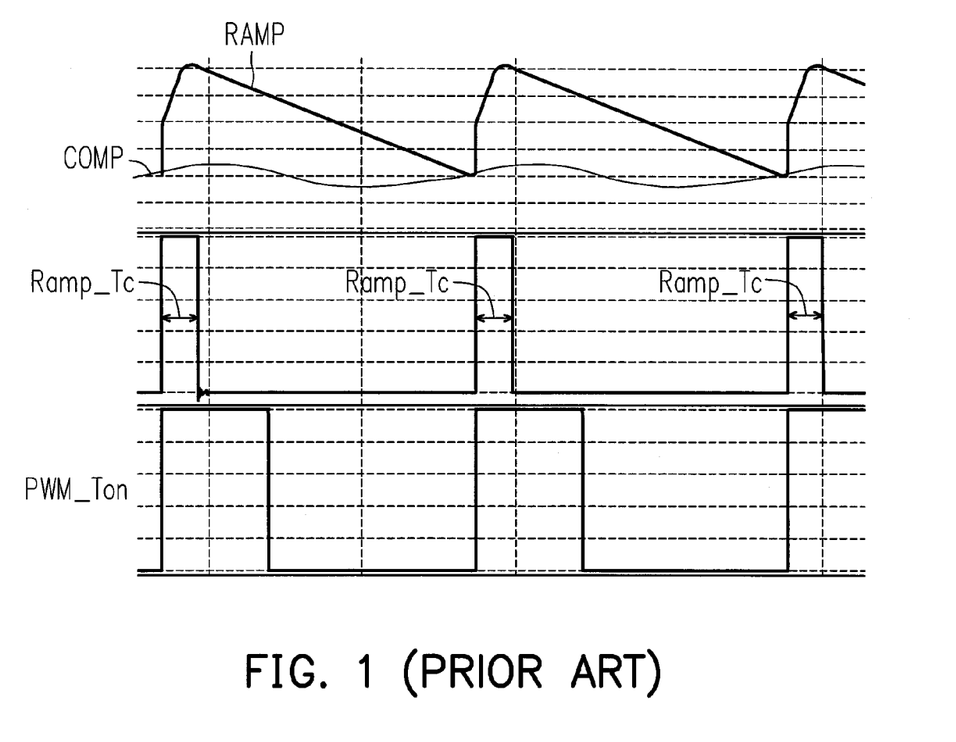
FIG. 1 is a waveform diagram of a conventional circuit structure with constant on time.

Referring to FIG. 1, in a circuit structure with constant on time (COT), a single ramp signal RAMP is generally intersected with and compared with an error signal COMP to generate an on time signal PWM_Ton. When the on time signal PWM_Ton used for pulse width modulation is started to be calculated, the ramp signal RAMP is immediately reset and recharged to a vertex of a voltage level thereof. It has to spend a constant time Ramp_Tc for charging the ramp signal RAMP. However, along with variation of a frequency of the circuit structure or phase switching of multi-phase, the constant time Ramp_Tc is bound to occupy a considerable time on a cycle of the ramp signal RAMP. For example, it is assumed that the originally required constant time Ramp_Tc is 100 μs, when the frequency is increased to change the cycle of the ramp signal RAMP to 50 μs, a transient response phenomenon is occurred due to inadequate charging time, which probably causes phase instability.

SUMMARY

Accordingly, the invention is directed to a time generation circuit of a DC-DC controller and a control method thereof, which resolves the problem mentioned in the related art.

The invention provides a DC-DC controller. The DC-DC controller is coupled to an output stage. The DC-DC controller includes a ramp generating unit, a comparator, a logic circuit and a switch unit. The ramp generating unit generates a first interior-ramp signal and a second interior-ramp signal. An error signal relates to an output voltage. A first input terminal of the comparator receives the error signal. An output terminal of the comparator outputs a comparison signal. The logic circuit generates a first control signal and a second control signal according to the comparison signal. The switch unit is coupled to the ramp generating unit and the logic circuit. The switch unit alternately switches one of the first interior-ramp signal and the second interior-ramp signal to a second input terminal of the comparator according to the first control signal and the second control signal, wherein when the second interior-ramp signal is switched to the comparator, the ramp generating unit charges the first interior-ramp signal to a first voltage level, and when the first interior-ramp signal is switched to the comparator, the ramp generating unit charges the second interior-ramp signal to a second voltage level.

In an exemplary embodiment of the invention, discharging slopes of the first interior-ramp signal and the second interior-ramp signal are the same.

In an exemplary embodiment of the invention, the ramp generating unit alternately generates the first interior-ramp signal and the second interior-ramp signal in response to the comparison signal.

The invention further provides a DC-DC controller. The DC-DC controller includes a comparator and a ramp generating circuit. The comparator receives an error signal related to an output voltage and a ramp signal, and outputs a comparison signal. The ramp generating circuit is coupled to the comparator. The ramp generating circuit generates a first interior-ramp signal and a second interior-ramp signal, wherein the ramp generating circuit alternately switches the first interior-ramp signal and the second interior-ramp signal to serve as the ramp signal according to the comparison signal.

In an exemplary embodiment of the invention, when the second interior-ramp signal is charged at a first voltage level, the first interior-ramp signal is discharged at a second voltage level.

In an exemplary embodiment of the invention, when the first interior-ramp signal is charged at a third voltage level, the second interior-ramp signal is discharged at a fourth voltage level.

In an exemplary embodiment of the invention, the first interior-ramp signal and the second interior-ramp signal are at least partially overlapped in timing.

In an exemplary embodiment of the invention, the ramp generating circuit includes a ramp generating unit, a switch unit and a logic circuit. The ramp generating unit is coupled to the switch unit. The switch unit is coupled to the logic circuit and the comparator. The ramp generating unit generates the first interior-ramp signal and the second interior-ramp signal to the switch unit. The logic circuit controls the switch unit to switch the first interior-ramp signal or the second interior-ramp signal to the comparator according to the comparison signal.

The invention provides a multi-ramp signal operating method, which is adapted to a DC-DC controller. The DC-DC controller is coupled to an output stage. The multi-ramp signal operating method includes following steps. A first interior-ramp signal and a second interior-ramp signal are alternately generated. A comparator is provided, wherein a first input terminal of the comparator receives an error signal, an output terminal thereof outputs a comparison signal, and the error signal relates to an output voltage. A first control signal and a second control signal are generated according to the comparison signal. One of the first interior-ramp signal and the second interior-ramp signal is alternately switched to a second input terminal of the comparator according to the first control signal and the second control signal, wherein when the second interior-ramp signal is switched to the comparator, the first interior-ramp signal is charged to a first voltage level, and when the first interior-ramp signal is switched to the comparator, the second interior-ramp signal is charged to a second voltage level.

According to the above descriptions, in the DC-DC controller and the multi-ramp signal operating method thereof, the first interior-ramp signal and the second interior-ramp signal are alternately switched, and the comparator compares the first interior-ramp signal with the error signal, or compares the second interior-ramp signal with the error signal. In this way, abnormity of the ramp signal of the conventional method caused by inadequate charging time can be avoided, so as to avoid the transient response phenomenon, and the problem of phase instability due to phase switching of multi-phase can also be avoided.

However, the above descriptions and the below embodiments are only used for explanation, and they do not limit the scope of the present invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Reference will now be made in detail to the exemplary embodiments of the invention, examples of which are illustrated in the accompanying drawings. Moreover, elements/components with the same or similar reference numerals represent the same or similar parts in the drawings and embodiments.

In the following embodiments, when "A" device is referred to be "connected" or "coupled" to "B" device, the "A" device can be directly connected or coupled to the "B" device, or other devices probably exist there between. The term "circuit" represents at least one component or a plurality of components, or at least one component or a plurality of components actively and/or passively coupled to each other to provide suitable functions. The term "signal" represents at least one current, voltage, load, temperature, data or other signal. The ramp signal can be a ramp-like signal, a triangular wave signal or a sawtooth signal, which can be a repeat-declining slope or a repeat-inclining slope, which is determined according to an actual application.

Figure 2:
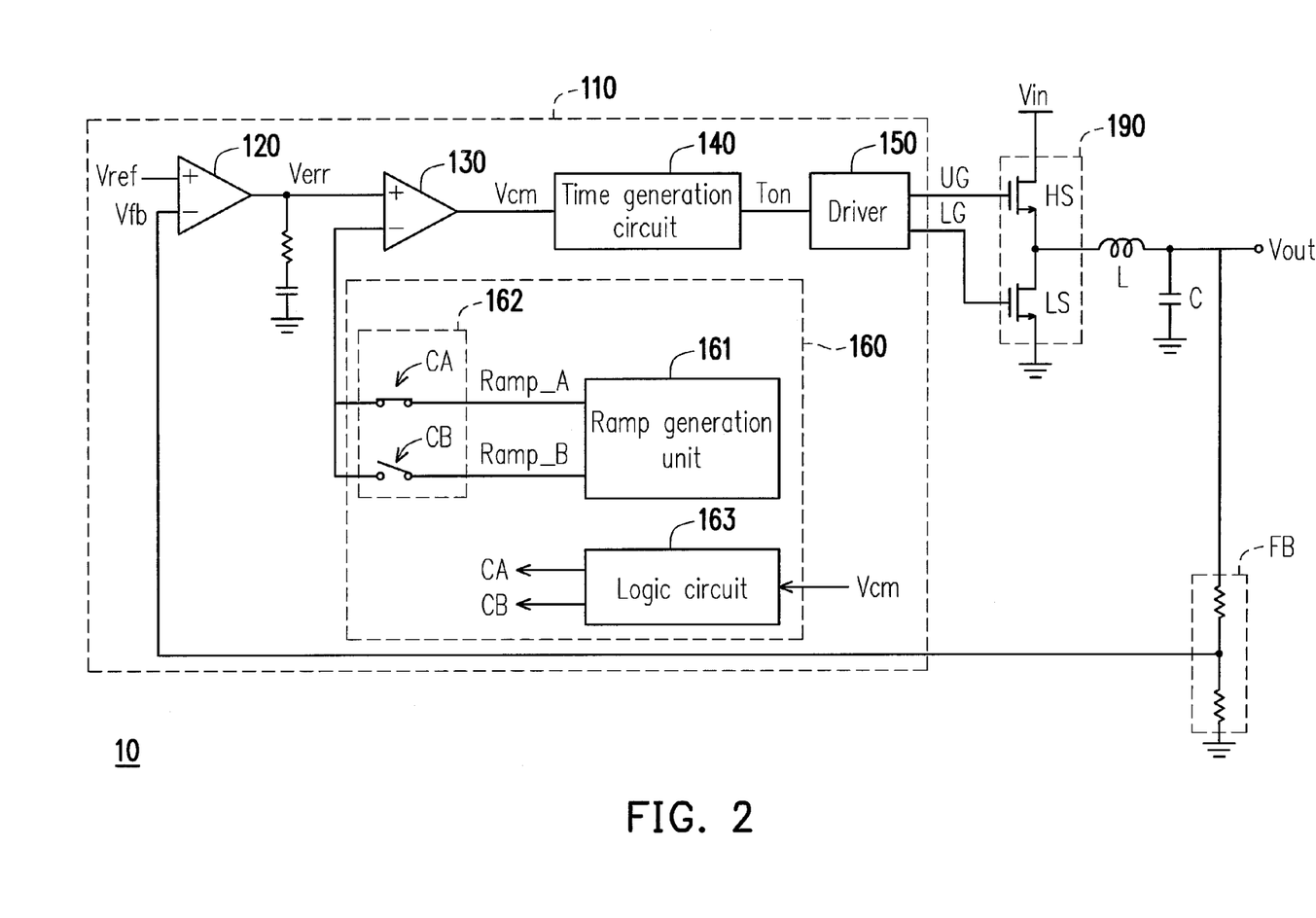
FIG. 2 is a structural schematic diagram of a DC-DC converter according to an embodiment of the invention.

FIG. 2 is a structural schematic diagram of a DC-DC converter according to an embodiment of the invention. Referring to FIG. 2, under a circuit structure based on constant on time (COT), the DC-DC converter 10 includes a DC-DC controller 110, an output stage 190, an inductor L, a capacitor C and a feedback circuit FB.

The DC-DC controller 110 is coupled to the output stage 190. The DC-DC controller 110 includes an error amplifier 120, a comparator 130, a time generation circuit 140, a driver 150 and a ramp generating circuit 160. In other embodiments, the error amplifier 120 can be a transconductance amplifier. The ramp generating circuit 160 includes a ramp generating unit 161, a switch unit 162 and a logic circuit 163. The ramp generating unit 161 is coupled to the switch unit 162. The switch unit 162 is coupled to the logic circuit 163 and the comparator 130.

The error amplifier 120 generates an error signal Verr according to a reference signal Vref and a feedback signal Vfb. The ramp generating unit 161 generates a first interior-ramp signal Ramp_A and a second interior-ramp signal Ramp_B, alternately. In the present embodiment, the first interior-ramp signal Ramp_A and the second interior-ramp signal Ramp_B are at least partially overlapped in timing. The error signal Verr relates to an output voltage Vout. A first input terminal of the comparator 130 receives the error signal Verr. An output terminal of the comparator 130 outputs a comparison signal Vcm. The logic circuit 163 generates a first control signal CA and a second control signal CB according to the comparison signal Vcm to control the switch unit 162. The switch unit 162 is coupled to the ramp generating unit 161 and the logic circuit 163. The switch unit 162 alternately switches one of the first interior-ramp signal Ramp_A and the second interior-ramp signal Ramp_B to a second input terminal of the comparator 130 according to the first control signal CA and the second control signal CB.

Figure 3:
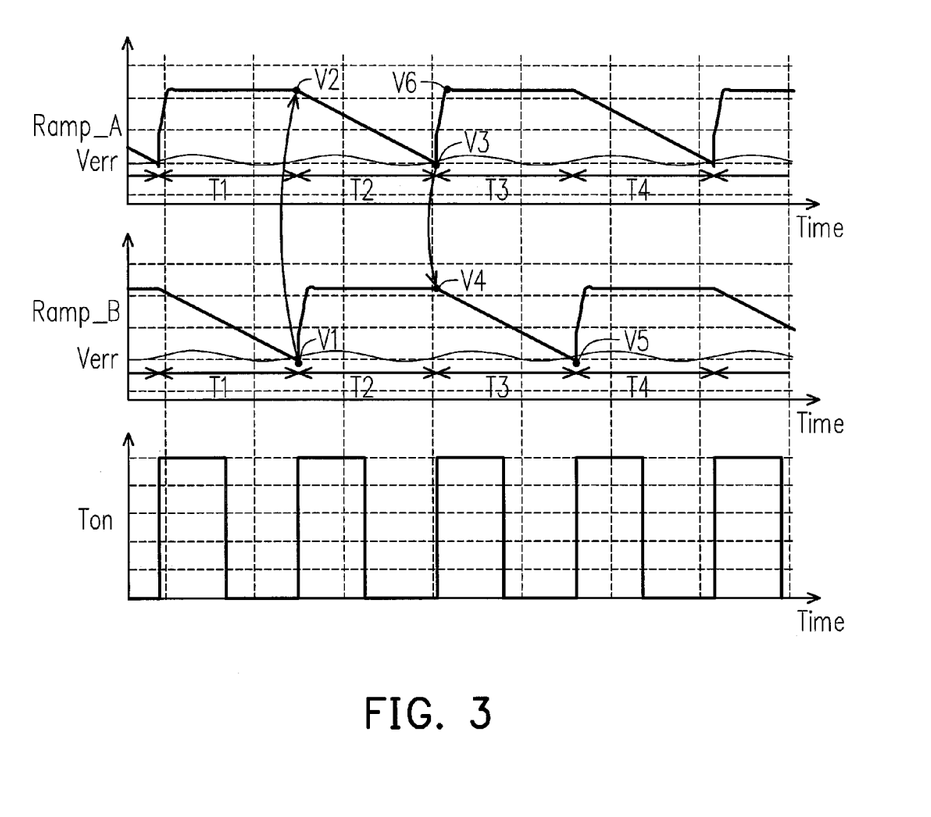
FIG. 3 is a waveform timing diagram of a circuit structure having multi-ramp signal according to an embodiment of the invention.

FIG. 3 is a waveform timing diagram of a circuit structure having multi-ramp signal according to an embodiment of the invention. Referring to FIG. 2 and FIG. 3, in the present exemplary embodiment, the DC-DC controller 110 adopts a manner of alternately switching the first interior-ramp signal Ramp_A and the second interior-ramp signal Ramp_B. During a time period T2, when the second interior-ramp signal Ramp_B is charged at a voltage level V1, the first interior-ramp signal Ramp_A is discharged at a voltage level V2. Meanwhile, the comparator 130 compares the first interior-ramp signal Ramp_A and the error signal Verr to generate the comparison signal Vcm. During a time period T3, when the first interior-ramp signal Ramp_A is charged at a voltage level V3, the second interior-ramp signal Ramp_B is discharged at a voltage level V4. Meanwhile, the comparator 130 compares the second interior-ramp signal Ramp_B and the error signal Verr to generate the comparison signal Vcm. Therefore, the first interior-ramp signal Ramp_A and the second interior-ramp signal Ramp_B are at least partially overlapped in timing. Therefore, the time generation circuit 140 generates an on time signal Ton used for pulse width modulation according to the comparison signal Vcm.

Further, during the time period T1, the first interior-ramp signal Ramp_A is a standby ramp signal, and the second interior-ramp signal Ramp_B is a ramp signal in operation. During the time period T2, the first interior-ramp signal Ramp_A is a ramp signal in operation, and the second interior-ramp signal Ramp_B is a standby ramp signal. During a time period T3, the first interior-ramp signal Ramp_A is the standby ramp signal, and the second interior-ramp signal Ramp_B is a ramp signal in operation. During a time period T4, the first interior-ramp signal Ramp_A is a ramp signal in operation, and the second interior-ramp signal Ramp_B is the standby ramp signal.

During the time period T2, if the first interior-ramp signal Ramp_A in operation is discharged, the voltage level V2 thereof drops till intersecting with the error signal Verr at the voltage level V3. Then, during the time period T3, the first interior-ramp signal Ramp_A is switched to a standby state, and the first interior-ramp signal Ramp_A is charged to a set voltage level V6 (V6=V2). While the first interior-ramp signal Ramp_A is switched to the standby state, the second interior-ramp signal Ramp_B is switched to an operating state from the standby state, "immediately" or "soon", the second interior-ramp signal Ramp_B is discharged, and the voltage level V4 thereof drops till intersecting with the error signal Verr at the voltage level V5 (V5≈V1). Then, tasks of the first interior-ramp signal Ramp_A and the second interior-ramp signal Ramp_B are again exchanged. In this way, abnormity of the ramp signal of the conventional method caused by inadequate charging time can be avoided, so as to avoid a transient response phenomenon, and a problem of phase instability due to phase switching of multi-phase can also be avoided.

Moreover, the driver 150 generates a high side switch control signal UG and a low side switch control signal LG according to the on time signal Ton to respectively control a high side switch HS and a low side switch LS in the output stage 190. The output stage 190 performs DC-DC conversion on an input voltage Vin, so that the DC-DC converter 10 can generate and output an output voltage Vout.

In an extended embodiment, the ramp generating circuit 160 can alternately generate at least two sets of ramp signals in response to the comparison signal Vcm, and the switch unit 162 alternately switches the different sets of ramp signals, wherein the first interior-ramp signal Ramp_A and the second interior-ramp signal Ramp_B are regarded as two sets of ramp signals. Similar to the aforementioned embodiment, the comparator 130 alternately compares the switched ramp signal with the error signal Verr.

Moreover, taking the time period T3 as an example, after the switch unit 162 disconnects the first interior-ramp signal Ramp_A from the comparator 130, the ramp generating unit 161 charges the first interior-ramp signal Ramp_A from the voltage level V3 of the error signal Verr to the voltage level V6 (V6=V2).

Still taking the time period T3 as an example, if the comparator 130 compares the error signal Verr and the second interior-ramp signal Ramp_B, the second interior-ramp signal Ramp_B gradually drops from the voltage level V4 till intersecting with the voltage level V5 of the error signal Verr, and the switch unit 162 disconnects the second interior-ramp signal Ramp_B from the comparator 130 according to the second control signal CB, and conducts the first interior-ramp signal Ramp_A to the comparator 130 according to the first control signal CA.

Similarly, taking the time period T2 as an example, when the switch unit 162 disconnects the second interior-ramp signal Ramp_B from the comparator 130, the ramp generating unit 161 charges the second interior-ramp signal Ramp_B from the voltage level V1 of the error signal Verr to the voltage level V4.

Moreover, the voltage level V2 can be equal to the voltage level V4. Discharging slopes of the first interior-ramp signal Ramp_A and the second interior-ramp signal Ramp_B are the same.

It should be noticed that the DC-DC controller 110 resolves the problem of inadequate charging time (Tc) of the related art, so that the generated multi-ramp signals tend to ideal situations. When the time generation circuit 140 calculates the on time signal Ton, the switched ramp signal simultaneously discharges and drops. When the pulse width modulation is performed, shapes of the first interior-ramp signal Ramp_A and the second interior-ramp signal Ramp_B are not changed along with the setting frequency, the input voltage Vin or the output voltage Vout. When the voltage level V2 is equal to the voltage level V4, an intersecting point (which is a steady state point) of the first interior-ramp signal Ramp_A and the error signal Verr and an intersecting point of the second interior-ramp signal Ramp_B and the error signal Verr are all on a same voltage level.

Figure 4:
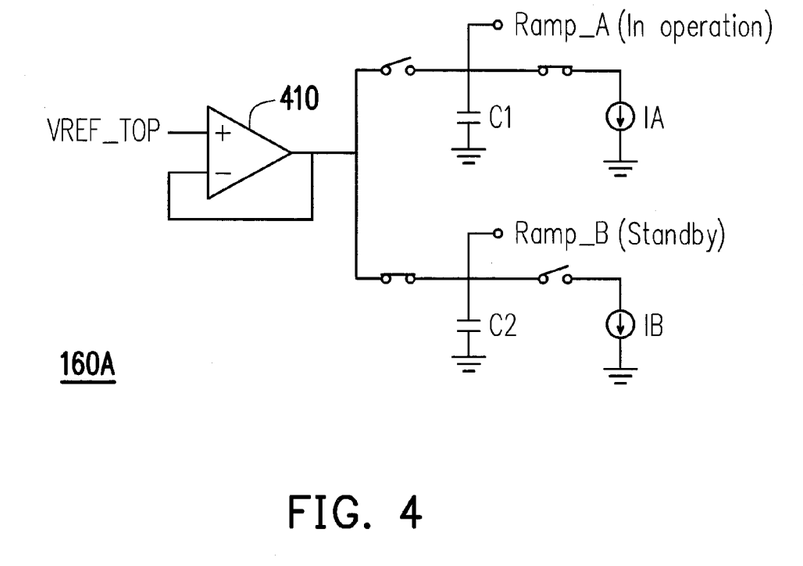
FIG. 4 is an implementation of a ramp generating circuit 160 of FIG. 2.

FIG. 4 is an implementation of the ramp generating circuit 160 of FIG. 2. Referring to FIG. 4, the ramp generating circuit 160A includes an amplifier 410, a capacitor C1, a current source IA, a current source IB and a plurality of switches. A non-inverted input terminal of the amplifier 410 receives a reference voltage VREF_TOP, and an inverted input terminal of the amplifier 410 is connected to an output terminal thereof. The switches in the ramp generating circuit 160A can be controlled by the comparison signal Vcm. At a same time, one of the first interior-ramp signal Ramp_A and the second interior-ramp signal Ramp_B is defined as a ramp signal in operation, and the other one is defined as the standby ramp signal, wherein the ramp signal in operation is transmitted to the comparator 130 of FIG. 2.

In FIG. 4, the discharging slopes of the first interior-ramp signal Ramp_A and the second interior-ramp signal Ramp_B can be the same. For example, when the capacitor C1 is equal to the capacitor C2, and the current source IA is equal to the current source IB, the discharging slopes of the first interior-ramp signal Ramp_A and the second interior-ramp signal Ramp_B are $dv/dt=IA/C1=IB/C2$.

Figure 5:
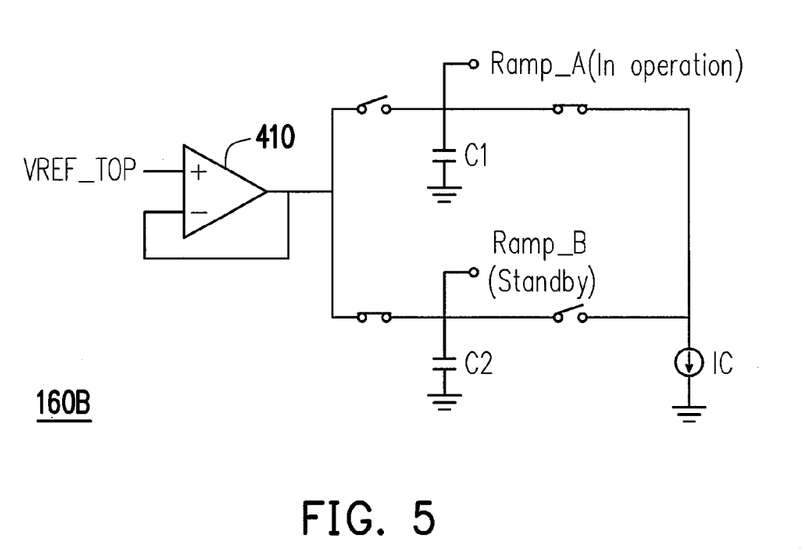
FIG. 5 is another implementation of the ramp generating circuit 160 of FIG. 2.

FIG. 5 is another implementation of the ramp generating circuit 160 of FIG. 2. Referring to FIG. 5, the ramp generating circuit 160B includes an amplifier 410, a capacitor C1, a current source IC and a plurality of switches. Compared to the ramp generating circuit 160A, the ramp generating circuit 160B commonly uses a same current source. When the capacitor C1 is equal to the capacitor C2, the discharging slopes of the first interior-ramp signal Ramp_A and the second interior-ramp signal Ramp_B are the same, and the discharging slop is $dv/dt=IC/C1=IC/C2$.

Figure 6:
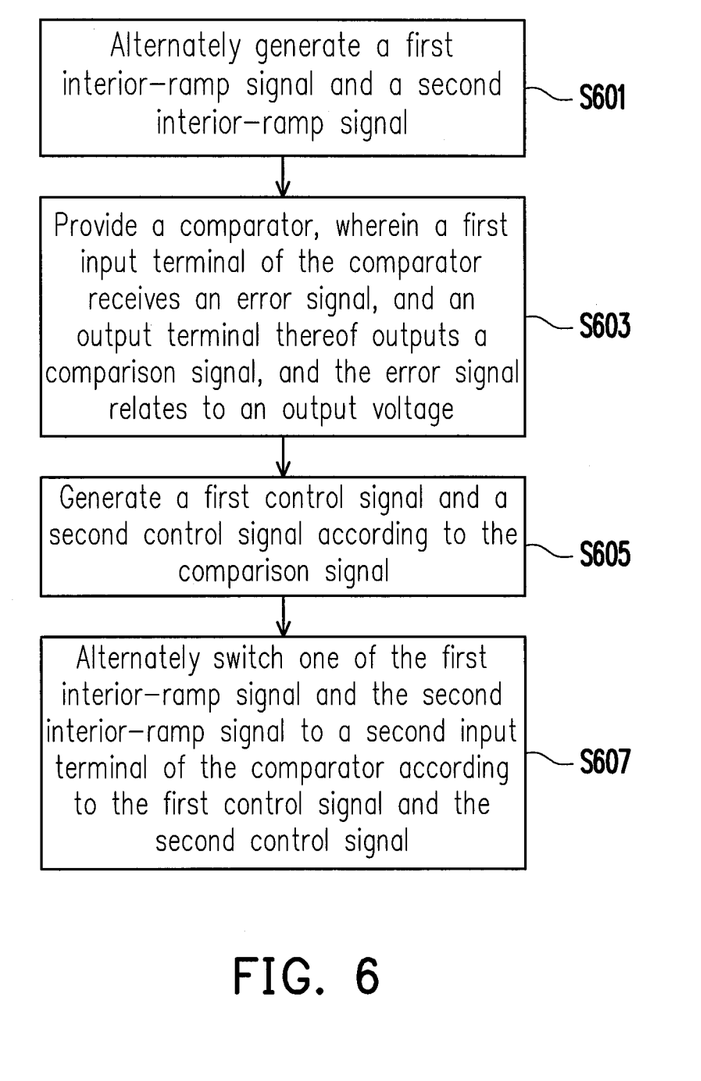
FIG. 6 is a flowchart illustrating a multi-ramp signal operating method according to an embodiment of the invention.

According to the above descriptions, a multi-ramp signal operating method is deduced below. In detail, FIG. 6 is a flowchart illustrating a multi-ramp signal operating method according to an embodiment of the invention. Referring to FIG. 2 and FIG. 6, the DC-DC controller 110 is coupled to the output stage 190. The multi-ramp signal operating method of the present embodiment may include following steps.

In step S601, the first interior-ramp signal Ramp_A and the second interior-ramp signal Ramp_B are alternately generated.

In step S603, the comparator 130 is provided, wherein a first input terminal of the comparator 130 receives the error signal Verr, an output terminal thereof outputs the comparison signal Vcm, and the error signal Verr relates to the output voltage Vout.

In step S605, the first control signal CA and the second control signal CB are generated according to the comparison signal Vcm.

In step S607, one of the first interior-ramp signal Ramp_A and the second interior-ramp signal Ramp_B is alternately switched to a second input terminal of the comparator 130 according to the first control signal CA and the second control signal CB. When the second interior-ramp signal Ramp_B is switched to the comparator 130, the first interior-ramp signal is charged to a first voltage level, and when the first interior-ramp signal Ramp_A is switched to the comparator 130, the second interior-ramp signal Ramp_B is charged to a second voltage level.

In summary, in the DC-DC controller and the multi-ramp signal operating method thereof, the first interior-ramp signal and the second interior-ramp signal are alternately switched, and the comparator compares the first interior-ramp signal with the error signal, or compares the second interior-ramp signal with the error signal. In this way, abnormity of the ramp signal of the conventional method caused by inadequate charging time can be avoided, so as to avoid the transient response phenomenon, and the problem of phase instability due to phase switching of multi-phase can also be avoided.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A direct current (DC)-DC controller, comprising:
   a ramp generating unit, generating a first interior-ramp signal and a second interior-ramp signal;
   a comparator, having a first input terminal receiving an error signal, and an output terminal outputting a comparison signal, wherein the error signal relates to an output voltage;
   a logic circuit, generating a first control signal and a second control signal according to the comparison signal; and
   a switch unit, coupled to the ramp generating unit and the logic circuit, and alternately switching one of the first interior-ramp signal and the second interior-ramp signal to a second input terminal of the comparator according to the first control signal and the second control signal,
   wherein when the second interior-ramp signal is switched to the comparator, the ramp generating unit charges the first interior-ramp signal to a first voltage level, and when the first interior-ramp signal is switched to the comparator, the ramp generating unit charges the second interior-ramp signal to a second voltage level.

2. The DC-DC controller as claimed in claim 1, wherein discharging slopes of the first interior-ramp signal and the second interior-ramp signal are the same.

3. The DC-DC controller as claimed in claim 1, wherein the ramp generating unit alternately generates the first interior-ramp signal and the second interior-ramp signal in response to the comparison signal.

4. A DC-DC controller, comprising: a comparator, receiving an error signal related to an output voltage and a ramp signal, and outputting a comparison signal; and a ramp generating circuit, coupled to the comparator, and generating a first interior-ramp signal and a second interior-ramp signal, wherein the ramp generating circuit alternately switches the first interior-ramp signal and the second interior-ramp signal to serve as the ramp signal according to the comparison signal, wherein the ramp generating circuit comprises a ramp generating unit, a switch unit and a logic circuit, the ramp generating unit is coupled to the switch unit, the switch unit is coupled to the logic circuit and the comparator, the ramp generating unit generates the first interior-ramp signal and the second interior-ramp signal to the switch unit, and the logic circuit controls the switch unit to switch the first interior-ramp signal or the second interior-ramp signal to the comparator according to the comparison signal.

5. The DC-DC controller as claimed in claim 4, wherein when the second interior-ramp signal is charged at a first voltage level, the first interior-ramp signal is discharged at a second voltage level.

6. The DC-DC controller as claimed in claim 4, wherein when the first interior-ramp signal is charged at a third voltage level, the second interior-ramp signal is discharged at a fourth voltage level.

7. The DC-DC controller as claimed in claim 4, wherein the first interior-ramp signal and the second interior-ramp signal are at least partially overlapped in timing.

8. A multi-ramp signal operating method, adapted to a DC-DC controller, wherein the DC-DC controller is coupled to an output stage, the multi-ramp signal operating method comprising:
   alternately generating a first interior-ramp signal and a second interior-ramp signal;
   providing a comparator, wherein a first input terminal of the comparator receives an error signal, and an output terminal thereof outputs a comparison signal, and the error signal relates to an output voltage;
   generating a first control signal and a second control signal according to the comparison signal;
   alternately switching one of the first interior-ramp signal and the second interior-ramp signal to a second input terminal of the comparator according to the first control signal and the second control signal, wherein when the second interior-ramp signal is switched to the comparator, the first interior-ramp signal is charged to a first voltage level, and when the first interior-ramp signal is switched to the comparator, the second interior-ramp signal is charged to a second voltage level.

9. The multi-ramp signal operating method as claimed in claim 8, wherein discharging slopes of the first interior-ramp signal and the second interior-ramp signal are the same.

10. The multi-ramp signal operating method as claimed in claim 8, wherein the ramp generating unit alternately generates the first interior-ramp signal and the second interior-ramp signal in response to the comparison signal.

* * * * *